May 27, 1924.

E. C. BERGAUS

SIGNAL

Filed May 19, 1923

Emil C. Bergaus.
INVENTOR
BY Victor J. Evans.
ATTORNEY

May 27, 1924.
E. C. BERGAUS
SIGNAL
Filed May 19, 1923
1,495,875
3 Sheets-Sheet 2
*Fig. 3.*
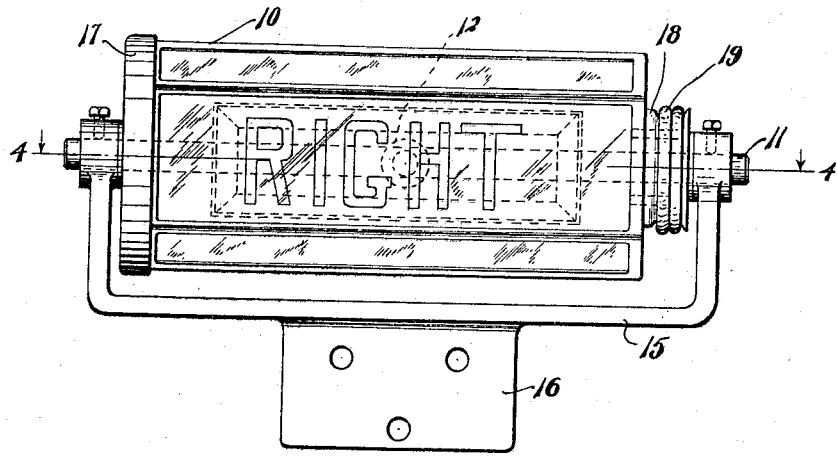
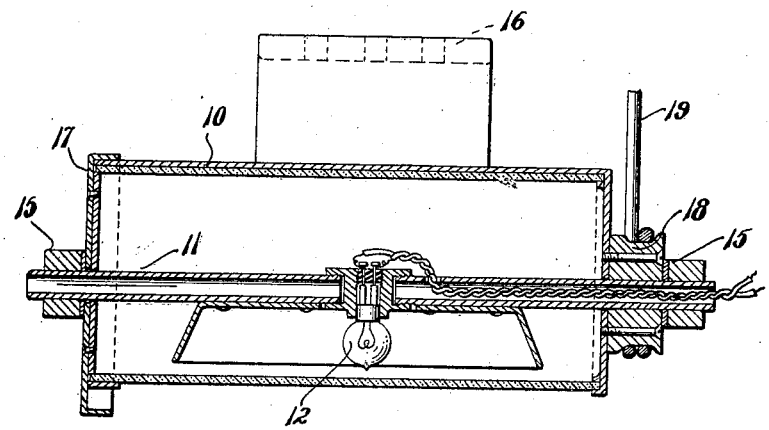
*Fig. 4.*
Emil C. Bergaus.
INVENTOR
BY Victor J. Evans.
ATTORNEY May 27, 1924.

E. C. BERGAUS

SIGNAL

Filed May 19, 1923

Emil C. Bergaus.
INVENTOR

BY Victor J. Evans.
ATTORNEY

WITNESS:

Patented May 27, 1924.

1,495,875

UNITED STATES PATENT OFFICE.

EMIL C. BERGAUS, OF LAS CRUCES, NEW MEXICO.

SIGNAL.

Application filed May 19, 1923. Serial No. 640,215.

*To all whom it may concern:*

Be it known that I, EMIL C. BERGAUS, a citizen of the United States, residing at Las Cruces, in the county of Dona Ana and State of New Mexico, have invented new and useful Improvements in Signals, of which the following is a specification.

This invention relates to direction signals for motor operated vehicles, and embodies amongst other features a lamp casing mounted for rotation at the rear of the vehicle, and having its sides provided with indicia to indicate to others the course the vehicle is about to pursue, or whether the vehicle is to be brought to a stop, the signal being operated from the dash board of the vehicle.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 3 is an enlarged view in elevation of the signal member.

Figure 4 is a sectional view taken on the line 4—4 of Figure 2.

Figure 1:
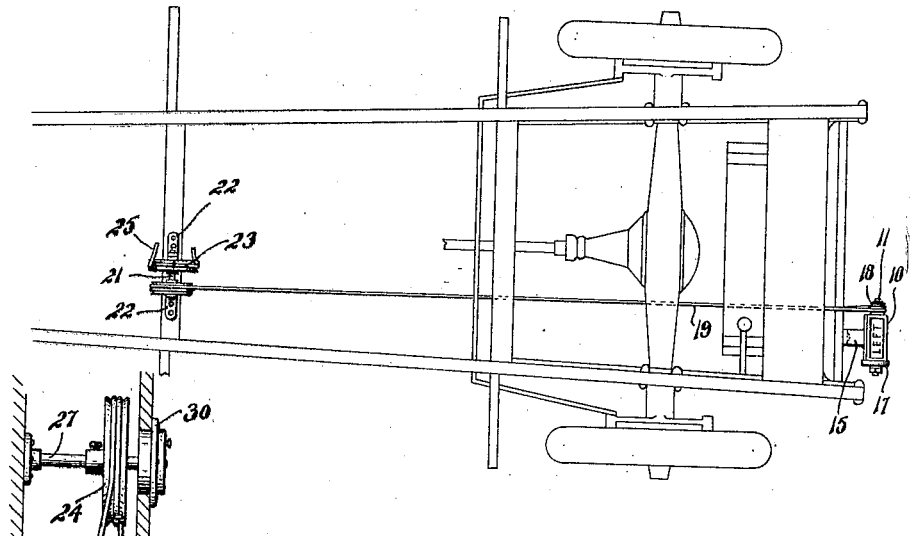
Figure 1 is a plan view of an automobile chassis showing the invention mounted thereon.
Figure 2:
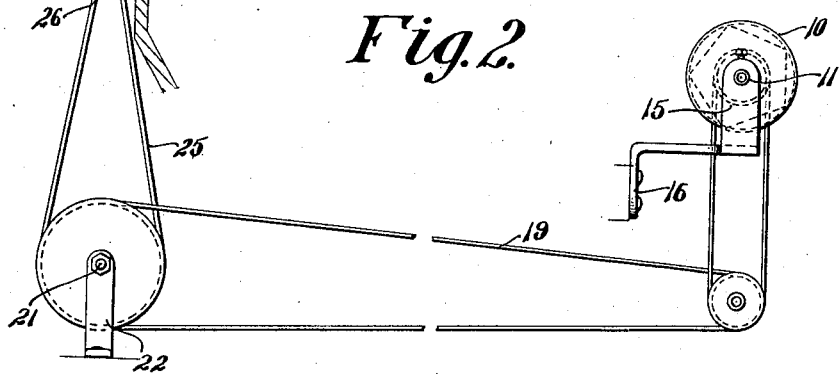
Figure 2 is an enlarged elevation of the signal and its operating means removed from the vehicle.
Figure 5:
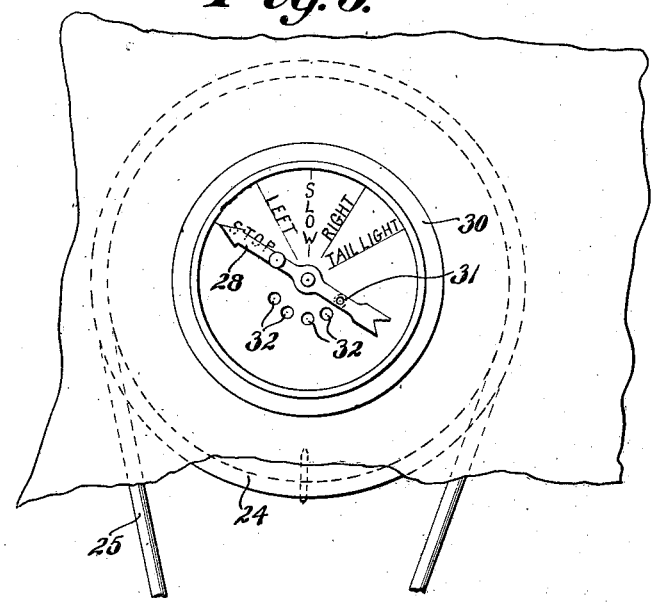
Figure 5 is a fragmentary view of the instrument board showing the dial and pointer mounted thereon.
Figure 6:
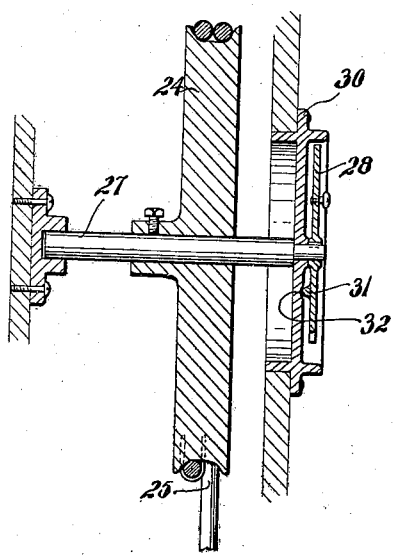
Fig. 6 is a side view of the structure shown in Fig. 5.

The signal forming the subject matter of the present invention essentially consists of a lamp box or casing 10 which is mounted for rotation on a stationary shaft 11. This shaft is hollow and supports an electric light bulb 12 at a point centrally of the casing 10, the wires for this bulb pass through the hollow shaft as indicated at 13. The shaft is supported by a bracket 15 of suitable design, the bracket having a portion 16 so that it can be attached to the rear fender of the vehicle, or to the frame or other appropriate part thereof. The electric light bulb is connected in circuit with a suitable switch "not shown" which is arranged within convenient reach of the operator so that the bulb can be illuminated at will. It is desired to have it understood that the casing 10 can vary in size and cross sectional configuration without departing from the spirit of the invention, and the various sides of the casing is provided with the words "Right," "Left," "Slow" and "Stop," while one side is provided with a red lens, so that this side may be used in the capacity of a taillight. These all appear on lenses of different colors, each lens being slidably fitted in a suitable support arranged within the casing, and held therein by the end wall 17. This end wall can be removed for the purpose of separating or removing any of the lenses of the casing when the occasion may require. The opposed end wall of the casing is provided with a pulley 18 over which is trained an endless cable 19, and through the instrumentality of which the lamp casing is rotated to selectively present to view any one side thereof.

Arranged adjacent the forward end of the vehicle is a transverse shaft 21 mounted in suitable bearings 22, and trained over this pulley is the other end of the endless cable 19. This shaft also supports an additional pulley 23 over which and a pulley 24 is trained the endless cable 25, the runs of this cable being crossed as at 26 so as to rotate the pulley 23 in the proper direction to impart rotary motion to the signal casing at the rear of the vehicle. The pulley 24 is carried by a shaft 27 which is arranged in advance of the dash board, and which shaft supports a pointer 28 in a position where it can be conveniently operated by the driver of the vehicle. This pointer moves across the dial 30 also secured to the dash board, and having the words "Right," "Left," "Slow," "Stop" and "Taillight" appearing thereon so that the operator of the vehicle can know just how far to turn the pointer in order to present any particular face of the lamp-casing to an active position. The pointer is provided with an enlargement 31 adapted to snap in openings or recesses 32 provided in the dial so that the pointer is held in any of its adjusted positions.

While it is believed that from the foregoing description the nature and advantages of the invention will be readily apparent, I desire to have it understood that I do not limit myself to what is herein shown and described, and that such changes may be resorted to when desired as fall within the scope of what is claimed.

Having thus described the invention, I claim:

An operating means for signals comprising a plate having an indicia thereon and further provided with a series of depressions, oppositely extending annular flanges carried by the plate and one of which being adapted to be received in an opening in the dash board of an automobile, a stub shaft having one end journaled in the plate and its opposite end rotatably supported at a point forwardly of the plate, a rotatable element fixed to the shaft and adapted to be operatively connected with a signal, an indicating element fixed to the shaft and movable over the indicia on the plate and arranged within the confines of the second annular flange, an operating element carried thereby and a lug carried by one end of the element and adapted to successively engage in the depressions whereby to lock the shaft against accidental rotation.

In testimony whereof I affix my signature.

EMIL C. BERGAUS.